(12) United States Patent
Knopp

(10) Patent No.: US 6,249,068 B1
(45) Date of Patent: Jun. 19, 2001

(54) MOTOR CONNECTING PLUG, IN PARTICULAR FOR A VARIABLE-SPEED COMMUTATOR MOTOR, HAVING SLOTS FOR CONTACT TRACKS

(75) Inventor: Carsten Knopp, Pettendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/417,549

(22) Filed: Oct. 14, 1999

(30) Foreign Application Priority Data

Oct. 14, 1998 (EP) .................................................. 98119399

(51) Int. Cl.⁷ .................................................. H02K 11/00
(52) U.S. Cl. ........................ 310/71; 310/67 R; 310/68 B; 439/76.1
(58) Field of Search ..................................... 310/71, 67 R, 310/68 R, 68 B; 439/76.1, 76.2, 439, 440, 441

(56) References Cited

U.S. PATENT DOCUMENTS

| 4,616,149 | 10/1986 | Best . | |
|---|---|---|---|
| 5,528,093 | * 6/1996 | Adam et al. | 310/89 |
| 5,614,776 | * 3/1997 | Baumeister | 310/71 |
| 5,633,542 | * 5/1997 | Yuhi et al. | 310/40 MM |
| 5,984,695 | * 11/1999 | Riehl et al. | 439/76.1 |
| 6,011,341 | * 1/2000 | Toya et al. | 310/239 |

FOREIGN PATENT DOCUMENTS

| 4019787 A1 | 1/1991 | (DE) . |
| 0538495 A1 | 4/1993 | (EP) . |
| 2691024 | 11/1993 | (FR) . |
| 01319115 | 7/1989 | (JP) . |

* cited by examiner

Primary Examiner—Nestor Ramirez
Assistant Examiner—Thanh Lam
(74) Attorney, Agent, or Firm—Sughrue, Mion, Zinn, Macpeak & Seas, PLLC

(57) ABSTRACT

A motor connecting plug in the form of an insulation body (1) having power contact tracks (4; 5) that are positioned in pocket-like push-in holders (1.3; 1.4), and preferably having signal contact tracks (2; 3). The motor connecting plug is provided to simplify the manufacture and assembly of the structure that supplies electrical power and transmits signals between components (6, 7; 8.2, 8.3) that are arranged inside the motor and a supply and control unit (10) that is located outside the motor. The signal contact tracks (2; 3) are preferably stamped out of a contact plate, which is molded into the insulation body and has contact tracks preferably initially fixed in position with respect to one another via connecting webs that are later stamped out.

22 Claims, 3 Drawing Sheets

MOTOR CONNECTING PLUG, IN PARTICULAR FOR A VARIABLE-SPEED COMMUTATOR MOTOR, HAVING SLOTS FOR CONTACT TRACKS

The following disclosure is based on European Application No. 98119399.8, filed on Oct. 14, 1998, the disclosure of which is incorporated into this application by reference.

FIELD OF AND BACKGROUND OF THE INVENTION

The invention relates to new and useful improvements to a motor connecting plug, in particular for a variable-speed commutator motor. Plug connectors of this type are required for actuating drives in motor vehicles, in particular between power-supply, regulation and control components located inside the motor and an electrical supply, regulation or control unit provided outside the motor. Such electrical supply/regulation/control units are preferably accommodated in an electronics housing which is separate from the motor casing. With regard to the motor itself, commutator motors powered by the vehicle's on board DC system and coupled to downstream gearboxes are preferably used as the electric motors.

German Laid-Open Publication DE 40 19 787 A1 discloses a window winder driven by an electric motor. The drive unit of the window winder is arranged together with a speed sensor and a control and regulation electronics unit connected to it in a common, moistureproof housing. A circuit board embracing the control and regulation electronics unit is plugged into the casing, radially with respect to the motor axis through an opening in the casing. As a result, the circuit board both makes electrical contact with plug contacts on the drive unit and is positioned such that a speed sensor provided thereon is brought close to a speed encoder mounted on the rotor side of the motor. The circuit board is arranged in the common casing essentially parallel to the motor axis.

European Patent Application EP 0 538 495 B1 discloses another commutator motor/gearbox/drive unit which has an electronic housing plugged onto the gearbox housing and extending parallel to the motor casing. When the gearbox housing and the electronics housing are mechanically connected together, a circuit board, which is supported in this housing and contains the control and supply electronics unit, makes electrical contact with motor connections on a brush mounting plate in the commutator motor.

OBJECTS OF THE INVENTION

According to one object of the invention it is sought to provide an operationally reliable electrical contact-making connection between terminals inside and terminals outside the motor. Moreover, the connections should be simple and effective in terms of both manufacture and assembly. In particular, it is sought to provide such a connection between a brush mounting plate inside the motor and a supply and control unit fashioned on a circuit board outside the motor.

SUMMARY OF THE INVENTION

According to one formulation, the present invention is directed to an electric motor arrangement that includes an electric motor housed in a motor casing; and a motor connecting plug. The motor connecting plug includes an insulation body projecting from outside the motor casing into an interior space of the motor casing; and power contact tracks held by the insulation body and extending between first electrical power connections, located in the interior of the motor casing, and second electrical power connections, located outside the motor casing. The insulation body includes pocket-shaped, plug-in holders for receiving, guiding and mounting the power contact tracks.

The plug connector according to the invention allows its insulation body to be fitted easily and by industrial robots. It additionally promotes a high positioning accuracy, and thus fitting accuracy, of the contact tracks relative to their mating contacts when the final mutual installed state for operation is reached. According to preferred embodiments, the plug connector is also used for signal transmission, in particular for transmitting signals from a speed encoder inside the motor on the rotor side to a regulation or control unit outside the casing. In such a case, according to one refinement of the invention, signal contact tracks are integrated into the insulation body, preferably before the power contact tracks are fitted. In particular, the signal contact tracks are molded into the plastic insulation body, as inserts, in an injection-molding die. The signal contact tracks advantageously make contact with at least one speed sensor, which is fixed on the end piece of the insulation body inside the motor and is associated with the speed encoder.

BRIEF DESCRIPTION OF THE DRAWINGS

The invention and advantageous refinements thereof are explained in more detail below with the aid of diagrammatic, exemplary embodiments in the drawing, in which.

DETAILED DESCRIPTION OF THE PREFERRED EMBODIMENTS

Figure 1:
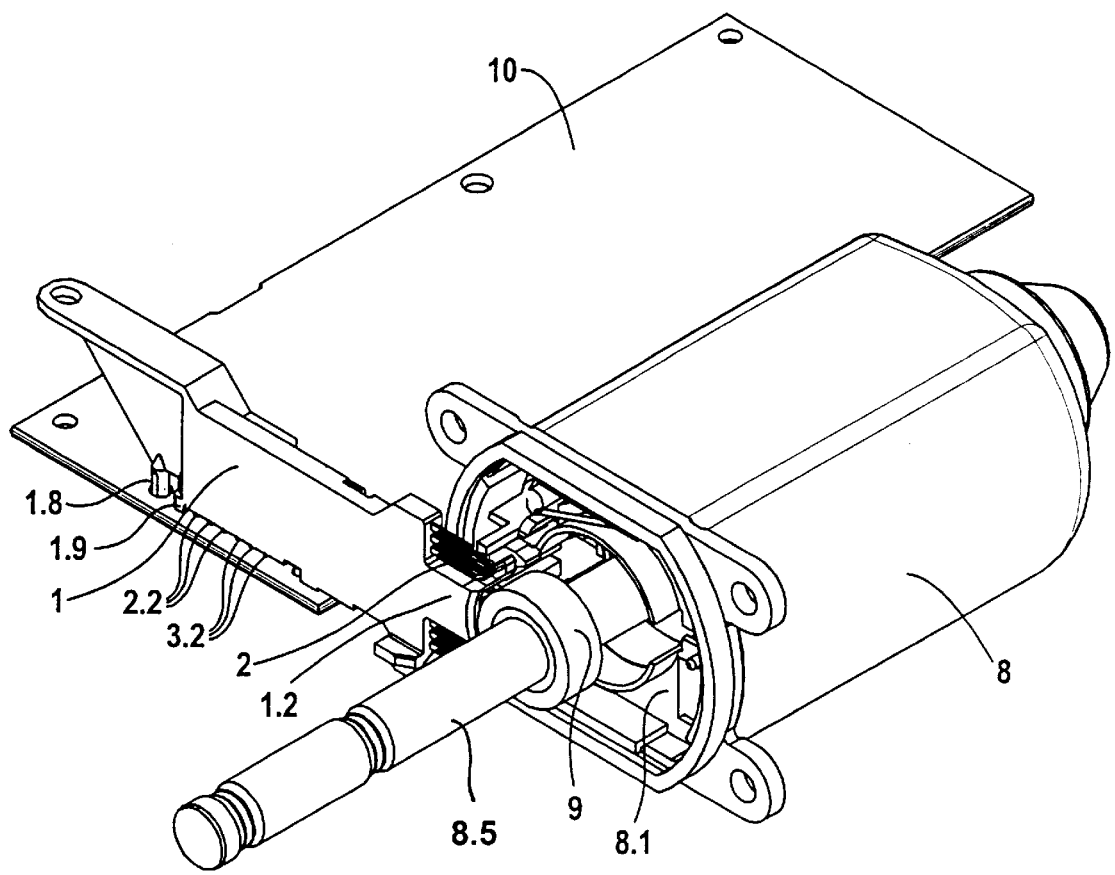
FIG. 1 shows a perspective view of a motor connecting plug as a plug connector between components inside the motor on the one hand and a supply and control unit outside the motor on the other.
Figure 2:
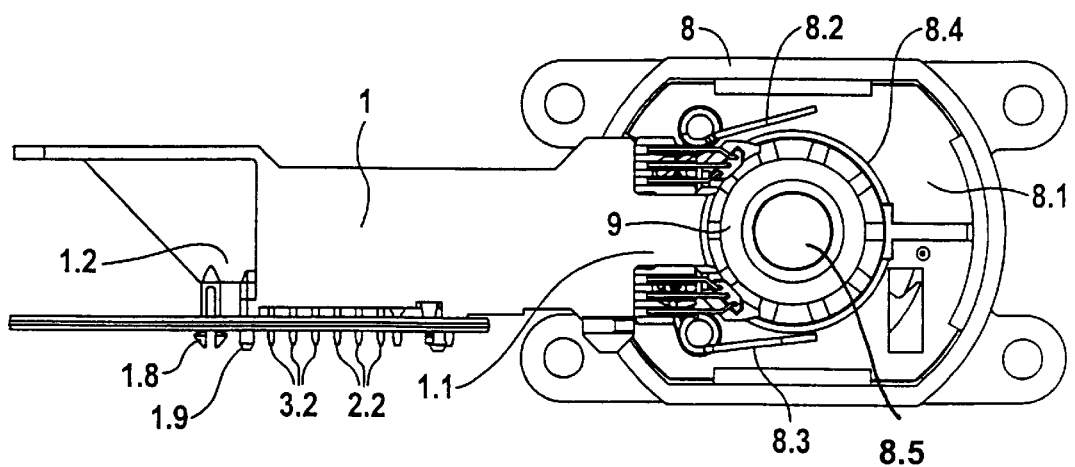
FIG. 2 shows an axial end view of the arrangement shown in FIG. 1.

A commutator motor is connected via a motor connecting plug in the form of a plug connector to a supply and control unit 10. The supply and control unit 10 is arranged outside the motor's casing 8 and constitutes a circuit board in this embodiment. One end of this plug connector projects into the commutator end of the motor inside the motor casing 8 and the other end of the plug connector is in contact with the supply and control unit 10. FIGS. 1 and 2 show the commutator motor not yet closed by a cover, which couples to the motor casing 8 about the rotor shaft 8.5.

The motor connecting plug essentially comprises an insulation body 1, which is preferably injection molded from plastic. Power contact tracks 4; 5 are provided in the insulation body 1, and extend from electrical power connections inside the motor on the one hand to electrical power connections (outside the motor) of the supply and control unit 10, on the other. The insulation body 1 additionally secures a plurality of signal contact tracks 2; 3. The free contact ends 2.1; 3.1 (see FIG. 6) of these signal contact tracks 2; 3 are disposed inside the motor when the insulation body 1 is snapped into its operational position, shown in FIGS. 1–2. These free contact ends 2.1; 3.1 project out of an end piece 1.1 of the insulation body 1 that also reaches inside the motor and are respectively connected to speed sensors 6; 7. The speed sensors 6; 7 are also incorporated into this end piece 1.1 and are associated with a magnet wheel 9 on the rotor side, to function as a speed encoder for the rotor shaft 8.5 in the commutator motor.

Figure 3:
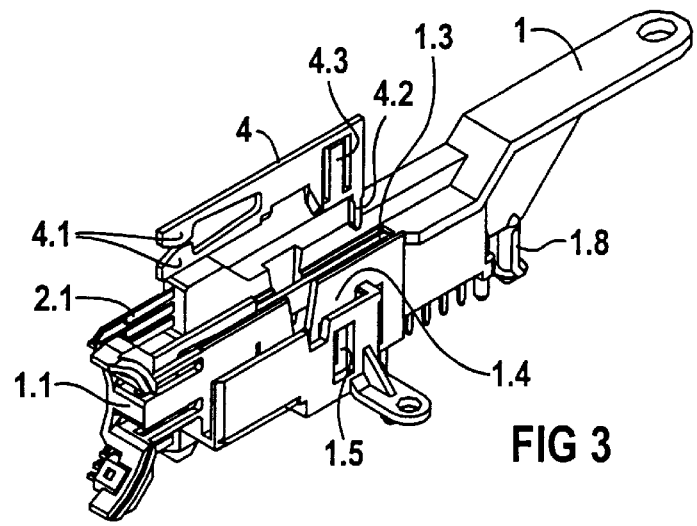
FIGS. 3–5 each show a perspective view of the motor connecting plug as shown in FIGS. 1 and 2, in three different insertion assembly stages of the power contact tracks relative to the insulation body that holds them.
Figure 4:
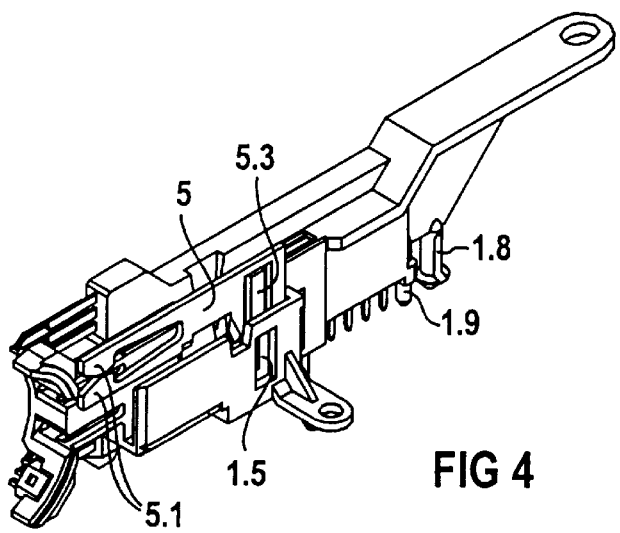
Figure 5:
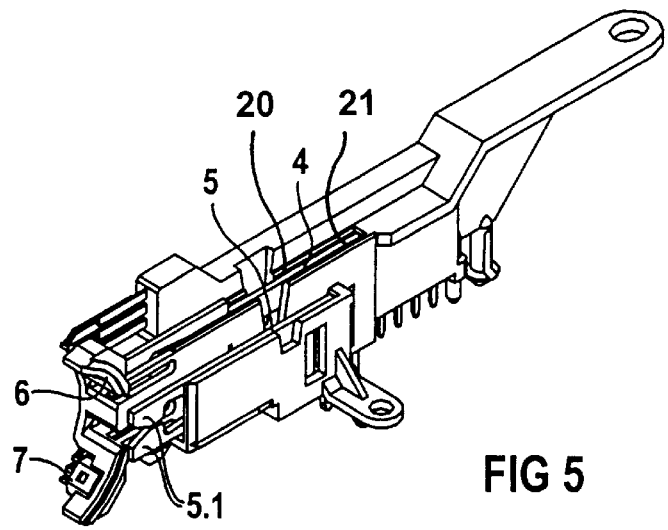

As can be seen in particular from FIGS. 3 to 5, the power contact tracks 4; 5 are prefabricated individual parts, preferably bent and stamped, and are inserted into corresponding pocket-shaped push-in holders 1.3; 1.4 in the insulation body 1. Each pocket 1.3; 1.4 includes two surfaces, e.g. pocket 1.3 includes two surfaces indicated in FIG. 5 by first and second surface edges 20; 21. When the power contact tracks reach their final position, they are preferably secured in the direction opposite the push-in direction by angled-off spring portions, embodied here as integrally formed spreading tongues 4.3; 5.3, latching behind latch holders, embodied here as tongue holders 1.5 in the insulation body 1. Such a design not only makes it simple for the insulation body 1 to be outfitted with the power contact tracks 4; 5 using industrial robots, but also ensures that the power contact tracks 4; 5 are accurately fixed in position. This latter advantage becomes significant particularly at the stage when the insulation body 1 is reliably fixed in place between the commutator motor and the supply and control unit 10.

Figure 7:
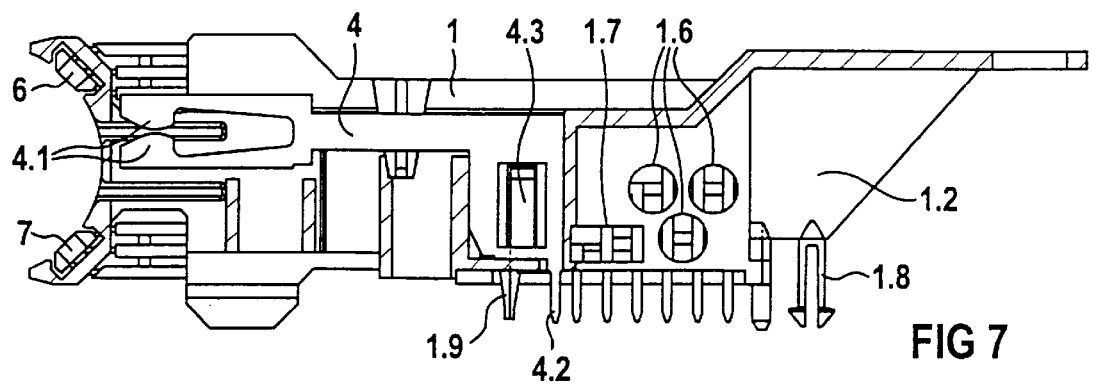
Figure 8:
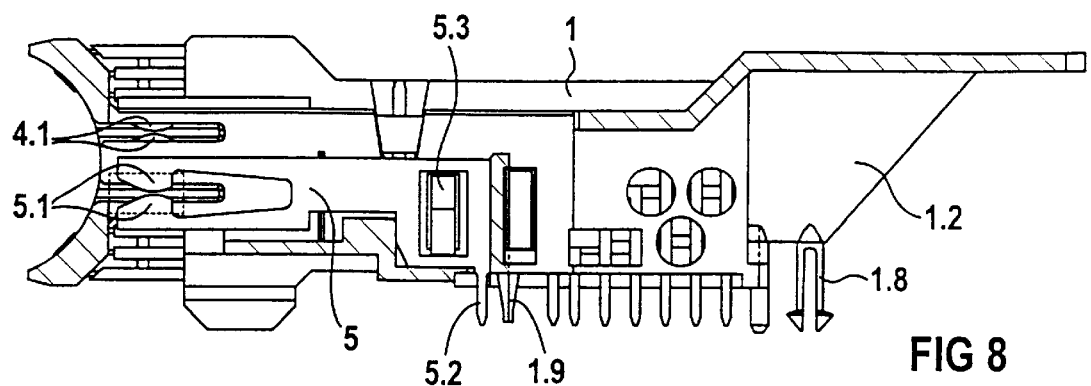

In the region of the end piece 1.1 of the insulation body 1 on the motor side, the power contact tracks 4; 5 are preferably provided with clamping tongues 4.1; 5.1. These clamp onto mating tongues to ensure electrical contact when the final installation position for operation is reached during assembly of the motor connecting plug and the motor casing 8. These mating tongues are mounted on the motor side of the brush plate 8.1 and are used to carry electrical power to the brushes 8.2; 8.3 which slide on the commutator 8.4. Both in the plane of the first power contact track 4 and in the plane of the second power contact track 5, a plug-in contact 4.2 and 5.2, respectively, projects out of the insulation piece 1 at the respective end outside the motor (see also FIGS. 7 and 8). These plug-in contacts 4.2 and 5.2, respectively, allow the power contact tracks 4; 5 to make contact with corresponding connections of the supply and control circuit 10, for example by soldering or crimping them to conductor tracks after insertion.

Figure 6:
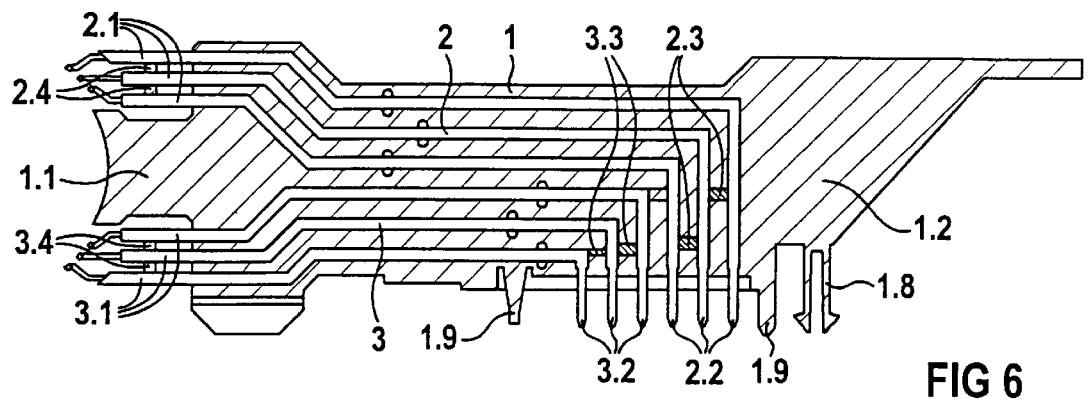
FIGS 6–8 each show a side view of sections through the motor connecting plug shown in FIGS. 3–5 in a first plane with a plurality of signal contact tracks, in a second plane with a first power contact track, and in a third plane with a second power contact track.

As best can be seen from FIG. 6, the signal contact tracks 2; 3 in this embodiment are held in another plane of the insulation piece 1 and at a distance from the plane of the power contact tracks 4 and 5, respectively. According to one preferred illustrative embodiment of the invention, these signal contact tracks 2; 3 are inserted in the correct position into injection-molding or casting dies when the insulation body 1 is injection-molded or cast, and are thereby molded or cast directly into the insulation piece 1. According to the illustrated embodiments, three signal contact tracks apiece are used for electrically connecting the supply and control unit 10 outside the motor with each of the speed sensors 6; 7. These speed sensors 6; 7 are secured to the end piece 1.1 of the insulation body 1 inside the motor and are matched with a speed encoder 9 on the rotor side. The speed sensors 6; 7 preferably are or include Hall elements; and the speed encoder 9 is preferably fashioned as a magnet wheel mounted on the rotor shaft 8.5. Contact is made with the speed sensors 6; 7 by means of free contact ends 2.1; 3.1 at the end of the contact tracks 2; 3 at a location inside the motor. Further free contact ends 2.2; 3.2 are provided in a similar manner at the other end of the contact tracks 2; 3 outside the motor, in order to establish contact with the supply and control unit 10.

In order to pre-position the total of six signal contact tracks 2; 3 in the insulation body 1 during insertion into the injection-molding or casting die, they are preferably connected to one another to form an integral signal contact track unit, for example by means of fixing connecting webs 2.3; 2.4 and 3.3; 3.4. Accordingly, once the injection-molded or cast insulation body 1 has hardened, the fixing connecting webs (which would otherwise produce short circuits) can be stamped away to thereby yield the actual signal contact tracks. If desired, stamped-out openings 1.6 and 1.7 can be provided in the insulation body 1, as access for appropriate stamping tools.

The supply and control unit 10 is expediently accommodated in an electronics housing, not shown here. The electronics housing can be supported, for example, on the insulation body 1, and is preferably arranged parallel to the motor casing 8. Guide elements 1.9 and/or latching elements 1.8 are preferably provided on the insulation body 1 and, in particular can be integrally molded on the insulation body 1. These elements 1.8 and 1.9 are used to align and fix the insulation body 1 and the supply and control unit 10 with respect to one another. These elements 1.8 and 1.9 cooperate with corresponding guide holders and/or latching holders on the supply and control unit 10, when they reach their final operating position with respect to one another.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An electric motor arrangement, comprising:
    an electric motor housed in a motor casing, said motor comprising a motor shaft defining an axis of said motor; and
    a motor connecting plug, comprising:
        an insulation body projecting from outside said motor casing into an interior of said motor casing in a direction transverse to the axis of said motor; and
        power contact tracks held by said insulation body and extending between first electrical power connections, located in the interior of said motor casing, and second electrical power connections, located outside said motor casing;
    wherein said insulation body comprises at least one pocket-shaped, plug-in holder for receiving, guiding and mounting said power contact tracks.

2. The electric motor arrangement as claimed in claim 1, wherein said electric motor is a variable-speed commutator motor.

3. The electric motor arrangement as claimed in claim 1, wherein said insulation body is a plastic body.

4. An electric motor arrangement, comprising:
    an electric motor housed in a motor casing;
    a speed encoder provided on a rotor side of said electric motor; and
    a motor connecting plug comprising:
        an insulation body projecting from outside said motor casing into an interior of said motor casing; and power contact tracks held by said insulation body and extending between first electrical power connections, located in the interior of said motor casing, and second electrical power connections, located outside said motor casing;

at least one speed sensor that is fixed at an end piece of said insulation body and that is located in the interior of said motor casing and assigned to said speed encoder; and signal contact tracks held by said insulation body and extending between contact connections, located in the interior of said motor casing and connecting said signal tracks to said speed sensor, and signal connections, located outside said motor casing, wherein said insulation body comprises at least one pocket-shaped, plug-in holder for receiving, guiding and mounting said power contact tracks.

5. The electric motor arrangement as claimed in claim 4, wherein said speed encoder comprises a magnet wheel and said speed sensor comprises a Hall element.

6. The electric motor arrangement as claimed in claim 4, wherein:

said signal contact tracks are injection-molded in said insulation body; and said contact connections are free contact end which project out of said end piece of said insulation body located in the interior of said motor casing and which connect said signal contact tracks to said speed sensor.

7. The electric motor arrangement as claimed in claim 4, wherein said signal contact tracks are stamped-out parts of an integral signal contact track unit which is incorporated into said insulation body.

8. The electric motor arrangement as claimed in claim 4, wherein said signal contact track unit is a contact track plate.

9. The electric motor arrangement as claimed in claim 4, wherein said end piece of said insulation body is configured in such a manner and supports said at least one speed sensor in such a manner that, in a mutual final installation position of said motor casing and said motor connecting plug, said end piece is located in the interior of said motor casing and said speed sensor is operationally associated with said speed encoder.

10. The electric motor arrangement as claimed in claim 4, wherein said end piece of said insulation body is configured in such a manner and supports said power contact tracks in such a manner that, in a mutual final installation position of said motor casing and said motor connecting plug, operational contact is established between the first electrical power connections and mating contacts of said electric motor, which are located in the interior of said motor casing.

11. The electric motor arrangement as claimed in claim 10, wherein said mating contacts are supported by a brush plate of said electric motor and establish a plug-in electrical contact connection with said first electrical power connections.

12. The electric motor arrangement as claimed in claim 4, wherein:

said speed encoder comprises a magnet wheel; and said end piece of said insulation body is located in the interior of said motor casing and is matched to a curvature of said magnet wheel.

13. The electric motor arrangement as claimed in claim 10, wherein said motor connecting plug comprises two said speed sensors mounted at an end surface of said end piece and extending tangentially to the end surface, said speed sensors being mounted at distally opposite ends of the end surface and being respectively electrically connected to said power contact tracks at the first electrical power connections.

14. The electric motor arrangement as claimed in claim 1, further comprising a supply and control unit; and wherein said second electrical power connections, located outside said motor casing, project from said insulation body and form plug-in contacts for establishing an electrical power connection to said supply and control unit.

15. The electric motor arrangement as claimed in claim 14, wherein said supply and control unit comprises a printed circuit board.

16. The electric motor arrangement as claimed in claim 4, further comprising a supply and control unit; and wherein said signal connections, located outside said motor casing, project from said insulation body and form plug-in contacts for establishing an electrical signal connection to said supply and control unit.

17. The electric motor arrangement as claimed in claim 16, wherein said supply and control unit comprises a printed circuit board.

18. The electric motor arrangement as claimed in claim 14, wherein, in a mutual final installation position of said motor casing, said connecting plug and said supply and control unit, said supply and control unit extends essentially parallel to the motor axis.

19. An electric motor arrangement, comprising:

an electrical motor component housed in a motor casing, said motor comprising a motor shaft defining an axial direction of said motor; and a plurality of electrical circuits arranged outside said motor casing;

an insulation body extending from said plurality of electrical circuits outside said motor casing to said electrical motor component in said motor casing along a direction transverse to the axial direction of said motor; and at least one power contact track secured to said insulation body and electrically connected between said electrical motor component and said plurality of electrical circuits;

wherein said insulation body includes a pocket; and wherein said power contact track is slidably inserted into said pocket in an operational state.

20. A connecting plug for an electric motor comprising:

at least one power contact track;

an insulation body having at least two surfaces releasably securing said power contact track as a plug-in element to said insulation body; and at least one speed sensor that is fixed at an end piece of said insulation body.

21. The connecting plug according to claim 20, further comprising:

at least one signal contact track non-releasably embedded in said insulation body.

22. The connecting plug according to claim 20, wherein:

said insulation body comprises a pocket that includes said two surfaces and that is configured to releasably receive said power contact track;

at least one of said two surfaces includes an opening defining a latch surface; and said power contact track includes an angled-off spring portion that engages behind said latch surface when said power contact track is fully inserted within said pocket.

* * * * *